United States Patent [19]
Hansen

[11] 3,850,111
[45] Nov. 26, 1974

[54] VEHICLE MOUNTED PLATE HAVING GUIDE ROLLERS

[75] Inventor: Howard C. Hansen, Battle Creek, Mich.

[73] Assignee: Clark Equipment Company, Buchanan, Mich.

[22] Filed: Oct. 23, 1973

[21] Appl. No.: 408,786

[52] U.S. Cl. ............... 104/245, 104/243, 180/79, 214/16.4 A, 280/150 R, 293/62, 293/72
[51] Int. Cl. ...... B60r 19/00, B61f 9/00, B61g 19/00
[58] Field of Search ........... 104/119, 242, 243, 244, 104/245, 246, 247; 180/79, 79.2; 214/16.4 A, 730; 280/150 R, 491; 293/62, 72

[56] References Cited
UNITED STATES PATENTS

| | | | |
|---|---|---|---|
| 206,416 | 7/1878 | Bowman | 104/119 |
| 1,748,309 | 2/1930 | Rose | 104/247 X |
| 2,447,028 | 8/1948 | Riddick | 280/491 R |
| 2,541,364 | 2/1951 | Jurasevich | 293/62 |
| 2,608,430 | 8/1952 | Robert | 293/72 X |
| 2,718,194 | 9/1955 | Ruhlman | 104/247 |
| 2,873,089 | 2/1959 | Porter | 104/243 X |
| 2,925,875 | 2/1960 | Bourdon | 180/79.2 |
| 2,985,479 | 5/1961 | Ortega et al. | 293/62 |
| 3,402,836 | 9/1968 | Debrey et al. | 214/16.4 A |
| 3,549,025 | 12/1970 | Messner | 214/16.4 A |
| 3,695,463 | 10/1972 | Weisker et al. | 214/16.4 A |
| 3,696,949 | 10/1972 | LeBlond et al. | 214/16.4 A |
| 3,710,524 | 1/1973 | Seiz | 104/247 |
| 3,727,778 | 4/1973 | Hollenbach | 214/16.4 A X |
| 3,762,588 | 10/1973 | Hansen et al. | 214/730 |
| 3,797,408 | 3/1974 | Barber et al. | 180/79 X |

*Primary Examiner*—Lloyd L. King
*Assistant Examiner*—Howard Beltran
*Attorney, Agent, or Firm*—John C. Wiessler

[57] ABSTRACT

A fending guide plate assembly for vehicles such as lift trucks for mechanically engaging aisle mounted side rails, or the like, by base plate side mounted guide rollers to guide the vehicle along narrow aisles as in warehouses. The base plate is securely mounted by shock absorbers from the vehicle chassis and extends adjacent to the floor under a major portion thereof. The shock absorbers permit the base plate to absorb and cushion forces imposed thereon from any direction relative to the chassis, thus limiting the effect of shock loads encountered, for example, when entering narrow aisle ways between guide rails. Adjustment members, such as bolts, support the guide plate assembly from the floor when it is not engaged with the vehicle and are adjustable to lower and raise the assembly for disengagement from the vehicle or for engagement therewith, the vehicle being driveable onto and from the plate assembly for connection thereto and disconnection therefrom.

15 Claims, 9 Drawing Figures

VEHICLE MOUNTED PLATE HAVING GUIDE ROLLERS

BACKGROUND OF THE INVENTION

The field of art to which the invention pertains includes vehicular guide means, and more specifically mechanical guide means for industrial vehicles.

In order to conserve high cost floor space in warehouses and other storage buildings, material storage racks are located longitudinally closely adjacent one another so as to form very narrow aisles between the rows of storage racks. The development of side-loader and order selector types of industrial trucks and stackers parallels the construction of very narrow aisle warehouses which has generated a requirement for mechanical constraints or guide means to insure vehicle movement in precise predetermined paths in the aisles between the rows of storage racks, and the like. The use of the narrowest possible aisle with combined vehicle guidance is advantageous both in maximizing the use of storage space, in insuring the capability of deposit and retrieval of loads from storage locations on both sides of the aisle without maneuvering the truck, and in eliminating the requiremnt for control of steering by an operator thereby permitting the operator to attend to other tasks.

Heretofore such vehicle guidance has been provided usually by the use of structural steel angle rails bolted to the floor along each side of each aisle and having installed low on each side of the guided vehicle a pair of side guide rollers in such a manner that when the vehicle is in the aisle the rollers contact the guide rails so that it is constrained to travel in a staight line between the rails.

A problem frequently encountered in the art concerns the provisions of adequate means for insuring, without over stressing and damaging vehicle parts, the alignment of the vehicle for entry into such a guide rail system. This has been accomplished previously by such means as outwardly flared guide rail throats or entry ways at the head of each aisle so that during entry the vehicle is forcibly aligned to enter the straight-line portion of the aisle. Inherent in this solution is the problem of handling the relatively high forces developed during misaligned entry, particularly when the vehicle is heavily loaded. Such entry forces must be absorbed by the side guide rollers and means for mounting the rollers on the vehicle. Such forces are produced by initial impact of heavy vehicles with guide rails at entry sections, and by friction forces resulting from sliding such vehicles sideways to achieve initial alignment. One solution has been to use heavy springs to provide a resilient entryway for absorbing such forces, such as is disclosed in U.S. Pat. No. 3,710,524. As a practical matter, however, the cost of such a construction in a typically large storage building is prohibitive.

Another problem in the art concerns the increasing variety of sizes and types of lift trucks, for example, which require the installation of side guide rollers, in turn requiring specialized designs, roller support assemblies, installation techniques, and the like, which may be time consuming and costly, both for the manufacturer and the user. Furthermore, many industrial trucks, particularly electric trucks, have side panels and doors which must be opened for routine servicing and maintenance. The installation of side guide roller hardware on such trucks may make more difficult the accessibility to these openings. The present invention minimizes or avoids such problems.

SUMMARY

My inventions provides a vehicular guide plate assembly adapted to be installed and dismounted from beneath a suitable vehicle with minimum effort, permitting the vehicle to be utilized for different purposes either with or without the combination therewith of the guide plate assembly which, when installed, is shock mounted for "give" in shear, compression or tension, or any combination thereof, in the absorption of forces imposed on the guide plate assembly, such as during aisle entry operation. Preferably, certain of the vehicle wheels extend through openings provided in the guide plate assembly when it is installed on the vehicle, the assembly being, upon disconnection from the vehicle, lowerable to floor level or other vehicle supporting surface so that the vehicle can be driven over and away from the guide plate assembly. The vehicle can be also driven onto the guide plate assembly for installation thereof on the vehicle, said assembly being thereby readily portable, independently storable and detachable from and connectible to such a vehicle, all with relatively little effort.

It is therefore a primary object of the invention to provide a unitary guide plate assembly for vehicles detachable from and connectible to the vehicle.

Another object is to provide mechanical guide means connectible to vehicles for guidance thereof in narrow aisles having improved means for minimizing the effect of forces imposed during alignment of the vehicle with the aisle at the entrance thereof.

It is another object to facilitate the connection to and disconnection from vehicles of mechanical vehicle guide assembly means, and to increase the adaptation of such guide means to vehicles of different types and configurations.

DESCRIPTION OF THE PREFERRED EMBODIMENT

Figure 1:
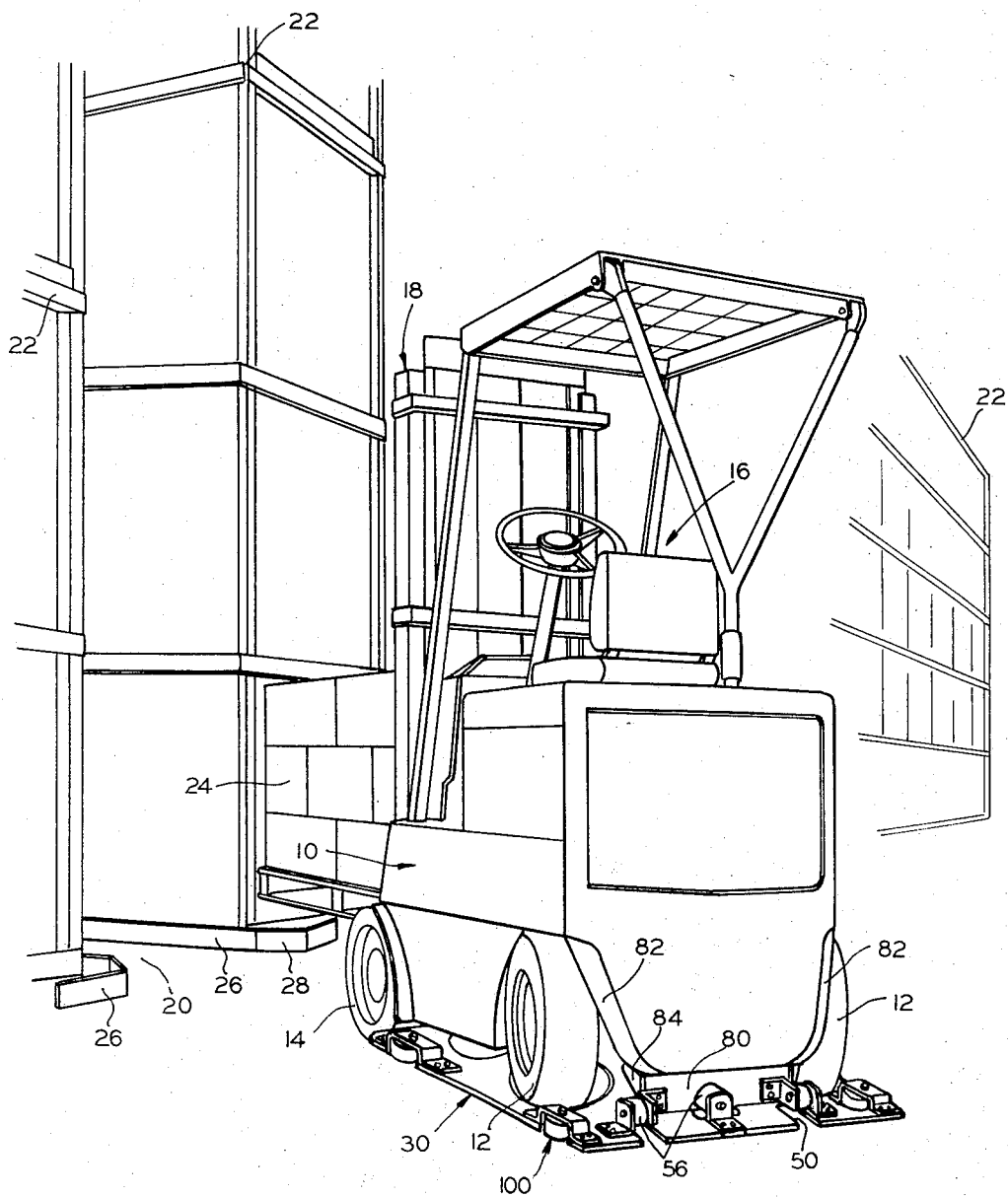
FIG. 1 is a perspective view of an industrial lift truck having a guide plate assembly connected thereto and negotiating a turn into a narrow aisle formed between floor mounted guide rails located adjacent warehouse storage racks.

A conventional industrial lift truck is shown having a frame and body construction generally illustrated at numeral 10 mounted on a pair of steering wheels 12 and a pair of traction wheels 14, having an operator's station generally shown at 16, and an upright mast assembly 18 which may embody a side loader attachment capable of loading and unloading from either side, as well as in front, of the lift truck, as shown, for example, in U.S. Pat. No. 3,762,588. Such an attachment is particularly suited for operation in narrow aisles such as illustrated at numeral 20 formed between storage racks 22 of a warehouse. A palletized load 24 is illustrated as being supported centrally of the truck for unloading to the left side of the truck in any selected rack opening following entry of the truck into aisle 20, the truck illustrated being of a counterweighted rider type, although my invention, with suitable modifications, may be adapted to trucks of various types.

A portion of the guide rails in aisle 20 is illustrated at numeral 26. They are preferably of rigid right angle metal construction bolted to the floor throughout the length of the aisle and having outwardly flared ends 28 preferably at both ends in order to facilitate the entry of the truck into the aisle, and exit therefrom, at either end of the aisle, as is well-known.

The guide plate assembly of my invention is illustrated generally at numeral 30. The structural details of said assembly and its method of connection to the particular industrial truck illustrated are shown in FIGS. 2-6, it being understood that the design and configuration of the guide plate assembly may be varied to suit requirements in the adaptation thereof to various vehiclar configurations without necessarily departing from the scope of the invention. The description which follows will, however, relate to the details of the particular embodiment herein disclosed.

Figure 2:
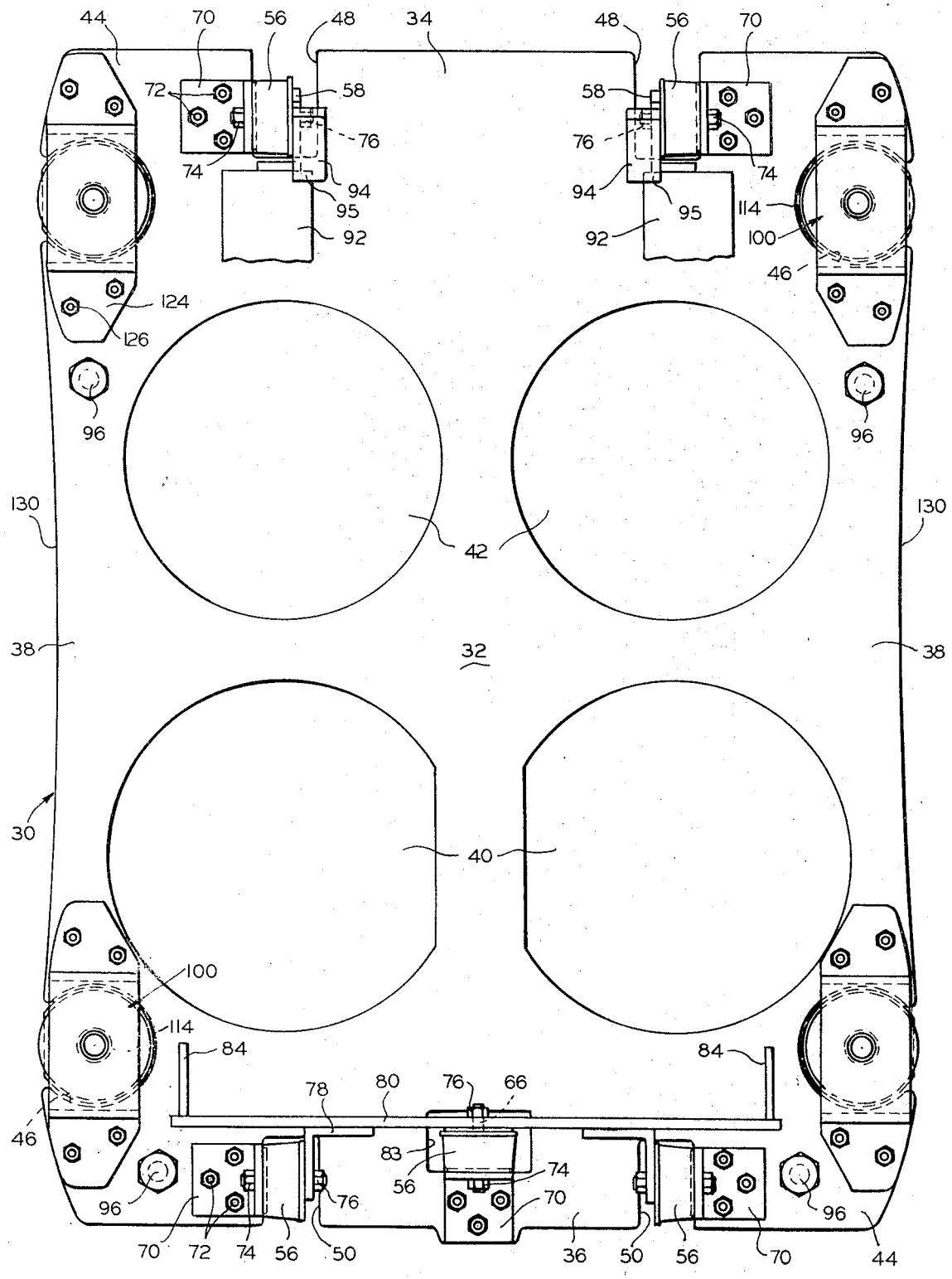
FIG. 2 is a plan view of the unitary guide plate assembly shown partially in FIG. 1 and showing certain lift truck frame members to which the assembly is secured.

The guide plate assembly is best shown in plan view in FIG. 2, the base plate 32 thereof being of a generally rectangular configuration, but with important modifications to be described. The base plate has a front portion 34, a rear portion 36, slightly concave opposite side portions 38, a pair of side-by-side rear openings 40 through which steer wheels 12 are adapted to project, a pair of front side-by-side openings 42 for the purpose of reducing the weight of the base plate, inwardly flared and rounded corner portions 44, a circular notch 46 cut into each side edge adjacent each corner portion thereof, and pairs of spaced rectangular notches 48 and 50 cut into the respective forward and rearward edge portions of the plate. The base plate 38 is preferably flame cut from plate steel to whatever configuration is required for a particular installation, the design as shown being merely exemplary.

It is preferred that such base plates will be cut by numerically controlled flame cutting machines for different truck frame mounting requirements for various types of trucks and for the mounting thereon of a variety of guide roller and shock absorber lcoations and sizes, to be described, and that fabrication of such a variety of base plates may be readily acccomplished at low production costs merely by re-programming the numerical control.

The base plate is connected to the truck by means of a plurality of shock absorbers 56, five as illustrated, two at the front and three at the rear of the plate, the number and capacity of which may vary to suit requirements. Each of the shock abosrbers 56 is suitably secured both to the truck frame and to the base plate, in a manner to be described, and thus comprise the sole connecting elements between the truck and base plate.

Figure 7:
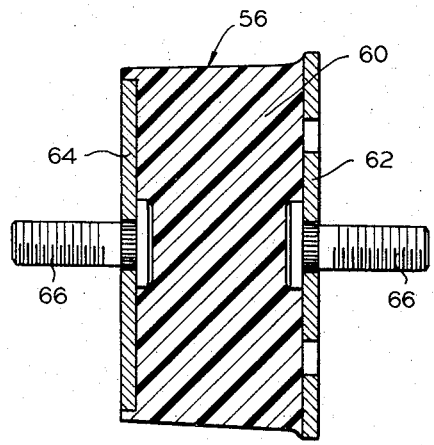
FIG. 7 is a sectional view of one of the shock absorbers.

An enlarged view in section of a suitable shock absorber is illustrated in FIG. 7 wherein a bonded resilient disc-like element 60, which may be of any suitable material such as rubber, Neoprene, Urethane, is bonded in a sandwich-type mounting between metal plates 62 and 64 and in which unit is integrally mounted to project outwardly of opposite sides thereof a pair of studs 66, as shown. Any suitable vibration damping characteristics for particular requirements may be selected. One manufacturer of such bonded shock absorbers is Lord Manufacturing Company of Erie, Pennsylvania.

Figure 5:
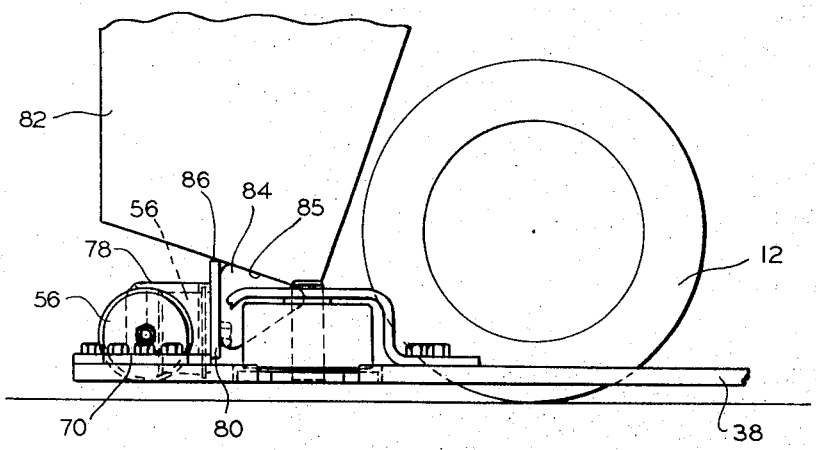
FIG. 5 is a partial side elevational view of the right rear corner portion of the guide plate assembly in relation to the right rear wheel and illustrates means for attaching to the lift truck that corner portion of the assembly.
Figure 6:
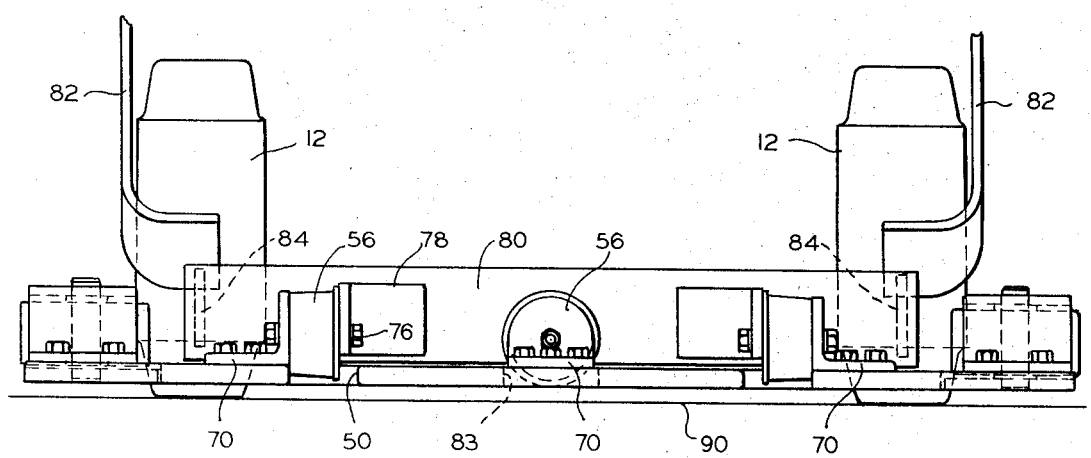
FIG. 6 is an elevational view of the rear end of FIG. 2 connected to a lift truck as in FIG. 5.

Referring particularly to FIGS. 2, 5 and 6, each of the three shock absorbers 56 is mounted to the base plate 38 at the rear end thereof by means of a right angle bracket 70 secured to the plate by three bolts 72 and to unit 56 by a nut 74 which is connected to the one stud 66. The other stud 66 of each side mounted shock 56 is secured by a nut 76 to the one leg of an angle bracket 78, the other leg of which is secured, as by welding, to a transversely extending base plate support member 80. These two side mounted rear shocks 56 are mounted to extend partially into notches 50 and resist primarily side loadings on the base plate in compression and tension, as well as longitudinal shear forces. The center mounted shock 56 is mounted on an axis transverse to the axes of the side mounted shocks and extends partially into a slot 83 in plate 38, being connected by a nut 74 to the one leg of another angle bracket 70 and to transverse support plate 80 by a nut 76 connecting the shock thereto at the forward stud 66 thereof.

Support member 80 is secured to a pair of transversely spaced truck frame members 82 by a pair of generally triangular shaped plate members 84 which are welded along the vertical rear edges thereof to opposite end portions of member 80 and along the upper biased edges 85 thereof to frame members 82, supporting member 80 being also welded at the ends thereof to frame members 82.

Figure 3:
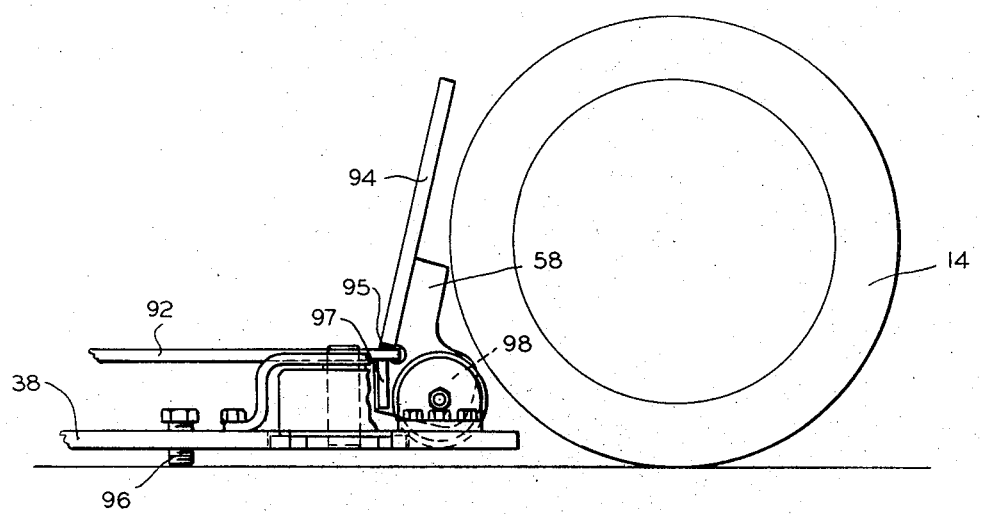
FIG. 3 is a partial side elevational view of the right forward corner portion of the guide plate assembly in relation to the right front wheel of the lift truck and illustrated means for attaching to the lift truck that corner portion of the assembly.
Figure 4:
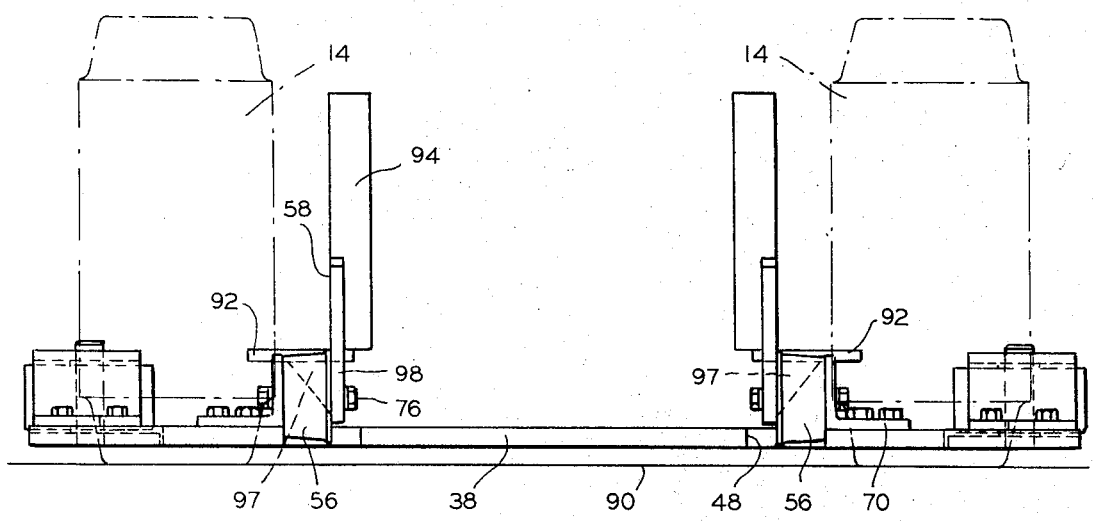
FIG. 4 is an elevational view of the front end of FIG. 2 connected to a lift truck as in FIG. 3.

Referring particularly to FIGS. 2, 3 and 4, the pair of spaced forward shocks 56 are similarly mounted from plate 38 by a pair of angle brackets 70, bolts 72 and nuts 74 and extend into spaced slots 48. The opposite and inner sides of front shocks 56 are connected to pairs of truck frame members 92 and 94 each pair of which is welded together at 95 and which are located at opposite sides of the truck inwardly of the respective wheels 14 by means of brackets 58 having a triangular outwardly extending gusset 97 secured at the upper marginal edge to frame members 92, an upwardly extending leg welded to each frame member 94 and a forwardly extending nose portion 98 secured to each shock 56 at the inner stud thereof by a nut 76. These forward shocks 56 resist sidewise forces in compression and tension and longitudinal forces in shear, the same as the rearwardly located transversely spaced shocks 56, while the rearwardly located center shock 56 resists longitudinal forces in compression and tension and sidewise forces in shear, and the five shock absorber mounts together resist combinations of such forces which may be directed transversely, longitudinally or angularly of the guide plate assembly.

The plate assembly provides adjustable jack bolts 96, two pair thereof being mounted as shown in FIG. 2, and one of which is shown in FIG. 3 in contact with the floor, having adjusted the assembly from floor level to the elevation shown at which the assembly has been connected to the lift truck. When the truck and plate are properly aligned in position for connection with the plate assembly, the jack bolts are adjusted as in FIG. 3 to raise the base plate so that the various brackets 70 can be connected to the shocks by nuts 74 and to the plate assembly by nuts 72. When it is desired to disconnect the plate assembly from the truck it is necessary merely to remove such sets of nuts 72 and 74, or nuts 76, and adjust jack bolts 96 to lower the plate assembly to floor level. When the forward shock assemblies and side guide wheel assemblies to be described are dismounted from the base plate by the simple means of detaching the connecting nuts and brackets thereof and then lowering the plate assembly to floor level by jack bolts 96, the truck may be driven forwardly over and away from the plate assembly for load handling operations which do not require the guide plate assembly to be mounted on the truck. Likewise, when it is desired to mount the plate assembly on the truck the truck may be driven onto the assembly until the steer wheels are located in the openings 40, whereupon the forward shock absorber and side guide wheel assemblies are mounted on the forward part of the plate assembly and the four jack bolts 96 adjusted to raise the entire plate assembly to a position, preferably about ½ inch in elevation in the type of truck illustrated in FIG. 1, at which the plurality of shock absorber assemblies are connected to the truck frame members as previously described.

In the design of guide plate assemblies according to my invention for different designs and types of vehicles with which the invention may be utilized, it will, of course, be understood that varying requirements may or may not necessitate the dismounting of such front shock absorber and side guide wheel assemblies to permit the drive-on, drive-off lift truck movements in relation thereto, depending upon the clearances provided in the design as between the rear steer wheels 12 and the spacing of the components at the forward end of the plate assembly.

Figure 8:
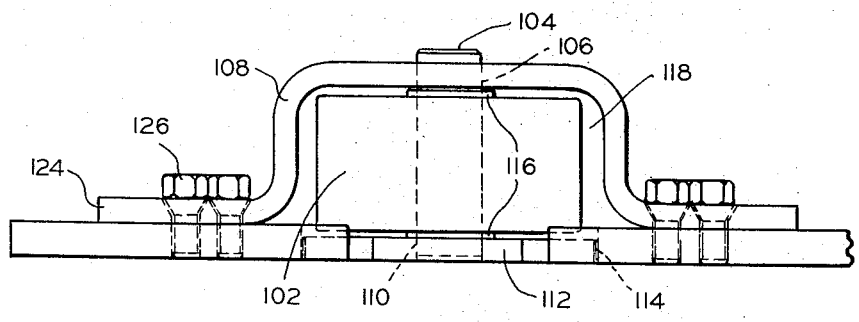
FIG. 8 is an enlarged side elevatitional view of a side guide wheel assembly connected to the baSe plate.
Figure 9:
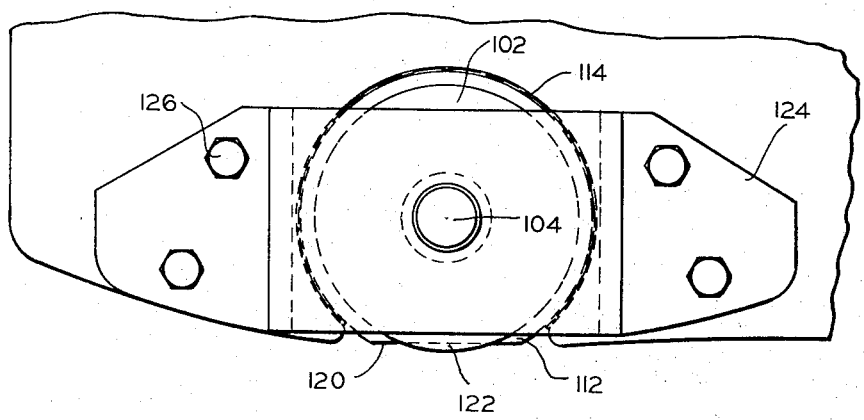
FIG. 9 is a plan view of FIG. 8.

As pointed out previously, each of four side guide roller assemblies, designated by numeral 100 shown most clearly in FIGS. 8 and 9, comprises rollers 102 preferably having polyurethane or rubber tires and high capacity wheel bearings, located and mounted for rotation in each of the locations illustrated on plate 38 by a stub shaft 104 which extends through an upper opening 106 in an inverted U-shaped mounting bracket 108 and through an opening 110 at the lower end in a bottom plate member 112 which is welded to a partial circular interior surface 114 cut into the base plate at each of the four locations illustrated for receiving a guide wheel 102 having upper and lower washer members 116 separating the guide wheel from bracket 108 and plate member 112, respectively, and supporting the guide wheel on plate 112 for rotation about a vertical axis in the space or well 118 formed thereby.

A significant feature of the invention is that the side guide wheels 102 protrude only slightly outside the profile of plates 112 which are circular but for a cord or straight cut outer portion 120 which provides for a small protrusion 122 of a peripheral portion of each guide roller 102 laterally outwardly of plate 112. In this manner the base plate 38 affords maximum protection for guide rollers 102 against high impact forces during entry of the lift truck into the aisle 20 in that the base plate can sustain metal to metal contact with the guide rails 26 while the side guide rollers are exposed only to the extent necessary to provide rolling contact therewith in the straight aisle following entry therein of the lift truck. The side guide roller assemblies are located and secured at wing portions 124 to base plate 38 by a plurality of bolts 126.

A feature of the base plate construction is the concavity of the side edges 130 as best shown in FIG. 2 which prevents binding and protects the side guide rollers during entry of the truck into aisles such as aisle 20.

In negotiating ramps, and the like, wherein the lift truck is required to traverse changes in the grade of the floor, it has been found desirable to provide a base plate configuration other than flat or coplaner, as would be projected by a side elevational view of the base plate 38 per se. That is to say, a transverse wave form or step may be configured in the base plate in order to permit the guide plate assembly when installed on a lift truck to negotiate such ramps or changes in grade without interference between the floor and base plate as the truck negotiates the changes in grade. No separate showing of this variation has been disclosed herein inasmuch as such a design feature will be apparent to persons skilled in the art.

Although I have described and illustrated a preferred embodiment of my invention, it will be understood by those skilled in the art that modifications may be made in the structure, form, and relative arrangement of parts without departing from the spirit and scope of the invention. Accordingly, it should be understood that I intend to cover by the appended claims all such modifications which fall within the scope of my invention.

I claim:

1. A guide plate assembly for wheeled vehicles having a frame means, comprising means supporting the guide plate assembly from the vehicle frame, said guide plate assembly including a base plate adjacent the vehicle supporting surface and extending in a plane under the vehicle frame and under a plane which passes through the axes of rotation of the wheels, and side guide roller means mounted at each side of the base plate extending at least partially above and peripherally outwardly of the base plate for guiding the vehicle in a track between guide rails.

2. A device as claimed in claim 1 wherein said base plate is a continuous plate extending both longitudinally and transversely under the vehicle frame and having openings formed therein through which extend one or more vehicle wheels for engagement with the vehicle supporting surface.

3. A device as claimed in claim 1 wherein a plurality of shock absorber means support the base plate from the vehicle frame both at the forward and rearward end portions of the base plate.

4. A guide plate assembly as claimed in claim 1 wherein shock absorber means are secured at a plurality of locations both to the base plate and to the vehicle inwardly of the periphery of the base plate.

5. A guide plate assembly as claimed in claim 4 wherein said shock absorbers are secured on one side thereof to the base plate and at the other side thereof are supported from frame members of the vehicle, said shock absorbers being mounted in different positional relationships to the base plate such that the shock absorbers function in combination to absorb forces imposed upon the guide plate assembly both in shear, compression and tension.

6. A guide plate assembly as claimed in claim 4 wherein said shock absorbers are of a bonded sandwich resilient type having rigid opposite side portions and integral outwardly projecting studs for connection to the base plate on one side and the vehicle on the other side.

7. A guide plate assembly as claimed in claim 1 wherein guide plate assembly adjustment means are adjustable to lower the base plate to substantially the level of the vehicle supporting surface and to elevate the base plate to a position wherein it is connectible to the vehicle.

8. A guide plate assembly as claimed in claim 7 wherein the adjustment means comprises a plurality of jack members located at predetermined positions in the base plate.

9. A guide plate assembly as claimed in claim 1 wherein said side guide roller means comprises a pair of longitudinally spaced side guide rollers located at each side of the base plate and mounted from inverted U-shaped brackets for rotation in a horizontal plane.

10. A guide plate assembly as claimed in claim 1 wherein said side guide roller means comprises a pair of longitudinally spaced side guide rollers at each side of the base plate, and a rigid member mounted on the base plate in a predetermined location in relation to each side guide roller such that each guide roller is supported therefrom and the peripheral portion of each guide roller exposed to contact a guide rail is limited by said rigid member.

11. A guide plate assembly as claimed in claim 10 wherein each of said rigid members comprises a substantially circular member having a cutout peripheral portion overlapped by a circular peripheral portion of each respective guide roller which comprises said exposed roller portion.

12. A guide plate assembly for wheeled vehicles having a frame means comprising means for supporting the guide plate assembly from the vehicle frame, said guide plate assembly including a base plate adjacent the vehicle supporting surface and extending in a plane under the vehicle frame, side guide roller means mounted at each side of the base plate, extending at least partially above and peripherally outwardly of the base plate and having mounting means associated therewith limiting the peripherally outwardly extending portion of each said guide roller so as to protect each such roller against failure from relatively high impact forces imposed on such rollers, and said base plate having associated therewith adjustment means adjustable to lower the guide plate assembly to substantially the level of the vehicle supporting surface and to raise the guide plate assembly for connection to the vehicle.

13. A guide plate assembly as claimed in claim 12 wherein a plurality of shock absorber means are secured both to the base plate and to the vehicle inwardly of the peripheral boundary of the base plate, said base plate being a continuous plate extending both longitudinally and transversely under the vehicle frame, and one or more openings in said base plate through which extend one or more vehicle wheels for contact with said vehicle supporting surface.

14. A guide plate assembly as claimed in claim 13 wherein a plurality of shock absorbers are secured to the base plate at predetermined locations and are adapted to be connected to portions of the vehicle for supporting the guide plate assembly under the vehicle in such a manner that forces in shear, tension and compression are resisted thereby.

15. A guide plate assembly as claimed in claim 12 wherein each said mounting means comprises a substantially circular member having a cutout peripheral portion overlapped by a circular peripheral portion of each respective guide roller which comprises the limited outwardly extending portion of each said guide roller.

* * * * *